United States Patent
McMillan

(10) Patent No.: US 8,647,072 B2
(45) Date of Patent: Feb. 11, 2014

(54) COMPONENT COMPRISING A RESIN MATRIX

(75) Inventor: Alison J. McMillan, Uttoxeter (GB)

(73) Assignee: Rolls-Royce PLC, London (GB)

( * ) Notice: Subject to any disclaimer, the term of this patent is extended or adjusted under 35 U.S.C. 154(b) by 436 days.

(21) Appl. No.: 13/025,650

(22) Filed: Feb. 11, 2011

(65) Prior Publication Data

US 2011/0217160 A1  Sep. 8, 2011

(30) Foreign Application Priority Data

Mar. 4, 2010  (GB) .................................. 1003592.1

(51) Int. Cl.
*F01D 5/14* (2006.01)

(52) U.S. Cl.
USPC ............... 416/229 R; 416/223 R; 416/241 A; 415/9

(58) Field of Classification Search
USPC ........... 415/9, 197, 200, 217.1; 416/2, 223 R, 416/229 R, 230, 233, 240, 241 R, 241 A
See application file for complete search history.

(56) References Cited

U.S. PATENT DOCUMENTS

| | | | |
|---|---|---|---|
| 3,646,182 A | | 2/1972 | Ferch |
| 4,957,801 A | * | 9/1990 | Maranci et al. ............... 428/147 |
| 5,470,649 A | * | 11/1995 | Farley ........................... 442/238 |
| 6,187,411 B1 | * | 2/2001 | Palmer .......................... 428/102 |
| 6,413,051 B1 | * | 7/2002 | Chou et al. ................ 416/229 A |
| 2005/0079334 A1 | * | 4/2005 | Hawkins et al. ........... 428/292.1 |
| 2008/0152853 A1 | * | 6/2008 | Blanton et al. ............... 428/36.4 |
| 2011/0017867 A1 | * | 1/2011 | Simmons et al. ............. 244/1 A |

FOREIGN PATENT DOCUMENTS

| | | |
|---|---|---|
| EP | 0 580 423 A1 | 1/1994 |
| EP | 1 505 103 A2 | 2/2005 |

OTHER PUBLICATIONS

Wilt, T.E., "Fracture Toughness Computational Simulation of General Delaminations in Fiber Composites", NASA Technical Memorandum NASA-TM-101415, Presented at the $29^{th}$ Structural Dynamics and Materials Conference in Williamsburg, VA, Apr. 18-20, 1988.*
Partial European Search Report issued in European Application No. 11 15 4109 dated Jul. 6, 2011.
Search Report issued in British Application No. GB 1003592.1 dated Jul. 2, 2010.

* cited by examiner

*Primary Examiner* — Nathaniel Wiehe
*Assistant Examiner* — Aaron Jagoda
(74) *Attorney, Agent, or Firm* — Oliff PLC

(57) ABSTRACT

A composite material comprises plies 2, 4, 6, 8, which may be prepregs. Film elements 10 are provided between at least two adjacent ones of the plies 2, 4, 6, 8. The film elements are made from a release material which inhibits adhesion between regions of the resin on opposite sides of the respective film elements, and are randomly distributed. The film elements 10 provide delamination sites within the component. The component may be a test piece for assessing the delamination behavior of the material. Alternatively, the delamination behavior caused by the film elements 10 may have a useful purpose, for example to control regions of a component in which delamination occurs following events such as a bird strike on a fan blade of a gas turbine engine.

8 Claims, 1 Drawing Sheet

COMPONENT COMPRISING A RESIN MATRIX

This invention relates to a component comprising a resin matrix and is particularly, although not exclusively, concerned with such components having a layered structure, including fibre reinforcement. Composite components of this kind are used in many applications, for example in gas turbine engines, in which, for example, aerofoil components and casing structures may be made from composite materials.

Such components may be layered components in the sense that the resin matrix contains reinforcement layers, commonly in the form of plies of woven fibres, although non-woven or knitted plies may be used.

Such components are strong and light in weight, but when subjected to excessive stress or shock loadings tend to fail by delaminating. That is, cracks propagate in the resin between the plies, so weakening the component. It is therefore generally desirable to take measures to resist delamination, for example by "through-thickness" reinforcements.

According to the present invention there is provided a layered component comprising adjacent layers and a resin matrix characterised in that in the resin matrix are randomly distributed film elements of a release material disposed between the adjacent layers which inhibit adhesion between regions of the resin on opposite sides of the respective film elements.

The term "random" and its derivatives are used in this specification in a broad sense. Thus, the term indicates not only true randomness, but also "pseudo-randomness" generated by, for example, an algorithm or other random pattern generator which achieves a distribution of the film elements which is not truly random but, while predictable, is sufficiently irregular to be regarded as random for practical purposes. The film elements may be distributed randomly in a single plane, or a narrow band within the components, or may be distributed randomly within the component in three dimensions.

At least some of the film elements may be entirely embedded in the resin matrix. In other words, the resin matrix extends from the respective film elements in all directions around their periphery, so that the film elements, or at least some of them, do not extend to the surface of the component.

There may be at least three layers and the film elements may be provided between the layers of at least two pairs of adjacent layers. Each adjacent layers may contain glass or carbon fibres. At least one of the layers may comprise a fibre reinforcement.
A reinforcement member extends through the adjacent layers. The reinforcement member may be metallic or fibrous.

The film elements, or at least some of them, may be of identical shape to one another, but in alternative embodiments the film elements may have two or more different shapes, or may be randomly shaped. At least some of the film elements may have a smoothly convex shape, for example they may be circular, elliptical or oval, or may have angular shapes such as triangles, quadrilaterals, hexagons or other polygons. At least some of the film elements may have re-entrant configurations, with at least part of their periphery being concave.

The maximum transverse dimension of each film element may lie in the range 1 to 100 mm, and the thickness of each flake is preferably not more than 10 μm and more preferably not more than 5 μm. The film elements are preferably sufficiently robust to be self-supporting in the absence of the resin matrix, although in some embodiments the film elements may be non-self-supporting, for example they may be in the form of a liquid or semi-liquid (such as grease) layer, or a powdery layer. The film elements may be made from a polymeric low-stick composition such as PTFE.

The component may comprise a test piece, adapted to be supported in a test machine for applying load to the test piece. Alternatively, the component may be a component of a gas turbine engine, such as a containment casing or an aerofoil component. The film elements may be distributed within the entire volume of the component, or may be confined to certain regions only. For example, if the component is an aerofoil component, the film elements may be confined to edge and tip regions of the component, leaving the central core of the component free of film elements.

Where the component is a layered composite component, the film elements may serve to initiate delamination between layers of the component at a load in excess of a threshold load, whereby the component has a first stiffness when subjected to loading below the threshold load, and has a second stiffness lower than the first stiffness after the component has been subjected to a load above the threshold load.

Another aspect of the present invention provides a method of manufacturing a layered component as defined above, comprising:
  providing a first resin-impregnated ply of reinforcing fibres;
  distributing the film elements randomly over a surface of the first ply;
  applying a second resin-impregnated ply of reinforcing fibres over the surface of the first ply on which the film elements are distributed; and
  causing or allowing the resin impregnation of the plies to set or cure.

The film elements may be self-supporting, and may be distributed over the surface of the first ply by sprinkling. Alternatively, each film element may be applied to the first ply in a predetermined randomly regenerated position.

In an alternative manufacturing method, a film element forming material may be directly deposited on the first ply to form randomly distributed areas of the material, which areas constitute the film elements. Alternatively, the film element forming material may be directly deposited on to a backing sheet which can then be applied to the first ply to transfer the material, constituting the film elements, to the first ply. The backing sheet can then be removed, or, if it is made from the resin material of the resin matrix, or a suitable compatible material, can remain in place to form part of the resin matrix.

As an alternative to a manufacturing process in which the component is made by laying up resin-impregnated plies of reinforcing fibres, the component may be made by a method in which a settable or curable resin is introduced into a mould in which the resin is caused or allowed to set or cure, the method comprising introducing the film elements into the fluid resin prior to introduction of the resin into the mould.

Such a method can be used to create a bulk block of the set or cured resin in which the film elements are randomly distributed. Alternatively, the method may comprise a resin transfer moulding process in which reinforcement fibres are disposed in the mould prior to introduction of the resin.

A third aspect of the present invention provides a method of manufacturing film elements for use in a component or a method as defined above, in which the film elements are cut from a sheet of the release material. Alternatively, the film elements may be shaved from a block of the release material or may be formed individually by moulding.

For a better understanding of the present invention, and to show more clearly how it may be carried into effect, reference will now be made, by way of example, to the accompanying drawings, in which.

Figure 1:
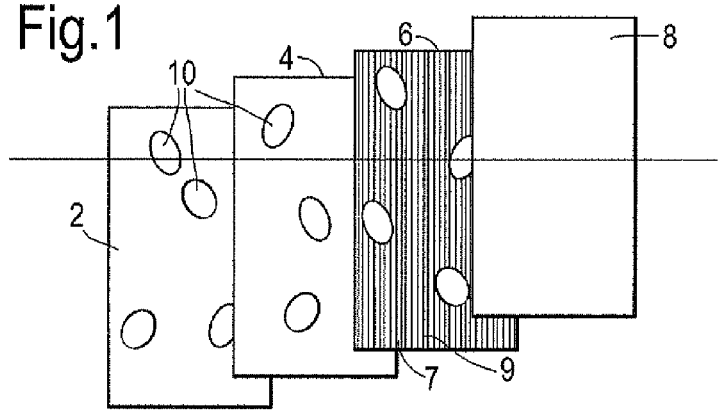
FIG. 1 is a diagrammatic representation of a lay-up for a composite component incorporating randomly distributed film elements.

FIG. 1 shows, in diagrammatic form, four plies 2, 4, 6, 8 of a composite panel. Each ply 2, 4, 6, 8 may, for example, be a prepreg, i.e. a fibre reinforcement impregnated with uncured resin. The first three plies 2, 4, 6 are provided with scattered elliptical pieces 10 so that, in the finished panel, the pieces are disposed between each pair of adjacent layers formed from the respective plies 2, 4, 6, 8. Each ply comprises a plurality of carbon, glass or other appropriate fibre within a resin matrix. In the embodiment shown the fibres are unidirectional and arranged at an angle of 0° to one edge of the component.

Other angles, for example, +/−30°, 45°, +/−60° or 90° may be used. The angles may vary between one layer and the next adjacent layer. The fibres may also be arranged in each layer in a woven configuration.

The pieces 10 comprise small, randomly positioned film elements of a release material. The release material may be any material which inhibits adhesion between regions of the resin on opposite sides of the respective film elements. The release material may, for example, be PTFE.

The film elements 10 may be scattered between any two layers in a composite panel or composite component. The film elements might be just placed between one pair of the plies, or between several or all of the plies in a layup.

Figure 2:
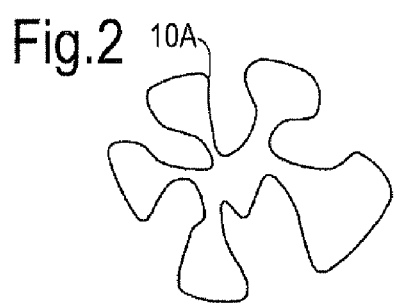
FIG. 2 illustrates an alternative shape for the film elements.

The film elements 10 could all have identical shapes, or they could have a variety of shapes. The shapes could be smooth convex shapes such as circles, ellipses (as shown in FIG. 1) and ovals, they could be angular shapes, such as triangles, quadrilaterals or hexagons, or they could be smooth or angular shapes having concave or re-entrant regions, such as "amoeba" shapes for the film element 10A as shown in FIG. 2, or star shapes. They could be shapes that tessellate so that they can be cut from a sheet of the release material with minimised wastage of film, or they could be nested and cut from the sheet with best material utilisation. Alternatively, the film elements 10 could be made directly to shape, for example using a printing process, or squirting a suitable polymer in liquid form into a mould, and then causing or allowing the polymer to set or cure.

The film elements 10 could be sprinkled into place on the or each respective ply 2, 4, 6 using a shaker device, in the manner of a salt shaker, or positioned precisely. Precision placement could be achieved using a "random" pattern generator to place the film elements 10 or to print the film elements 10 directly onto the respective ply 2, 4, 6, 8 using inkjet or other deposition techniques. Alternatively, the film elements 10 could be printed onto a piece of resin film that could be positioned between respective pairs of plies 2, 4, 6, 8 without affecting the quality of the interface between the resulting two layers formed from those plies. It may also be possible to shave the film elements 10 from a solid block in the manner of a cheese grater, although this is likely to have the disadvantage that complex shapes, and a sufficiently small thickness, would be difficult to achieve.

The film elements will, in typical components, have a diameter or other maximum dimension in the range of 1-100 mm. Sizes in this range will create delaminations that are of the same order of size as detectable delaminations encountered from Foreign Object Damage (FOD). At the larger end of the range, the resulting delaminations will be large enough to produce real differences in vibration modes in an aerofoil component. At the smaller end of the range high frequency vibration can cause the delamination to propagate as a high cycle fatigue failure.

Sizes larger than 100 mm may find application in some industries but within the aerospace industry components such as wings, fans and fuselages would not be expected to be airworthy with such a size of flaw.

Sizes smaller than 1 mm may find application in very small test pieces to scale up models of micro-sized effects.

The film elements 10, for many applications, will have minimal thickness to avoid excessive disruption of the layers of the composite. The thickness is preferably less than that of a composite layer and possibly less than 10 µm and possibly less than 5 µm.

Although PTFE is a suitable release material with the required low-stick qualities, other materials which cause poor adhesion between layers may be used, such as talc or other powders, grease spots or other low-stick polymers.

In the processes described above, the film elements 10 are applied to plies 2, 4, 6, 8 in the form of prepregs. However, the invention can also be employed in the manufacture of components in a resin transfer or resin infusion moulding process. In such a process, the film elements 10 could be mixed into the resin and drawn into the component during the moulding process. In this case the distribution of the film elements 10 would not be uniformly random, but would be concentrated in regions where there are changes in resin flow velocity during infusion (as sediment in a river collects at bends in the river). It might be advantageous to control the distribution of the film elements 10 by either modifying the mould, changing the inflow or outflow positions or pressures, or by modifying the ply contours.

While practical composite materials will invariably include fibre reinforcements, it may be useful for test purposes to create bulk resin blocks with no such reinforcement, but with randomly distributed film elements 10 embedded within them. This could help characterise the effects of flaws in resin-rich regions of a component. In composite components of complex shape, resin-rich regions are impossible to avoid; they occur at ply-drops, "T" shaped junctions and places where the geometry is highly shaped. It is desirable to be able to characterise the material properties of the resin which makes up such resin-rich regions. Because the resin matrix is not full of reinforcement fibres, the residual stresses and thermal effects created during curing differ between resin-free regions and regions close to fibre. However, the resin-free regions are of very small size, so it may be desirable to mimic the behaviour of such regions at macroscopic size in order to test, and observe failure mechanisms.

Another aspect of material testing that may be assisted by use of the film elements 10 is the investigation of the effect of localised delamination on the vibration response of thin plate-like components such as blades, vanes and covers. In the case of aerofoil components such as blades and vanes, the vibration response is highly important, as stiffness must be maintained despite some delamination in order to avoid flutter or fatigue damage under high amplitude vibration stresses. It is therefore useful to understand the extent of delamination that can be supported in such a component, before the stiffness under vibration is significantly reduced. Delamination can occur through manufacturing defects, or as a result of localised damage, for example FOD.

Visual inspection can detect a certain level of delamination, but is not sufficient for a detailed assessment to be made. Plate-like testpieces may be manufactured using standard techniques, but with film elements 10, as described above, provided at certain lamina interfaces, in order to mimic the localised delamination that might be encountered in real components during service. The testing of these test pieces can provide data to validate mechanical analysis of delaminated structures, and would also be suitable for testing under fatigue. Such fatigue testing is important, since it enables growth of the delamination zone to be characterised, so making it possible to determine the fatigue life of a component with FOD damage.

The present invention can be employed not only for the manufacture of test pieces, but also for functional components, such as casing structures for gas turbine engines. In such applications, the film elements 10 create delaminated regions which serve as crack-stoppers. The purpose of a containment casing is to absorb the kinetic energy of a failed blade, so as to prevent it from passing through the engine and escaping at high speed and hazarding the aircraft. A benefit of using composite materials in a containment casing results from the fact that delamination is a relatively benign failure mode. The casing can maintain its shape, and, so long as the delamination is localised, much of its stiffness too, Thus the blade energy can be absorbed, yet the casing remains stiff enough to withstand engine windmill loads and so endure the fly-home. One way to ensure that the delamination is localised is to insert through thickness reinforcements 24, which link the material structure across all plies. These through thickness reinforcements can be metallic (or other) Z pins, or they can be fibres inserted into the preform as stitching, tufting, or 3D weaving. Through thickness reinforcements are intended to transfer the load and the strain through all of the layers, but this has the disadvantage that a full thickness tear can initiate from the point where the through thickness reinforcement fibre is located. This destroys the integrity of the structure. The presence of randomly distributed film elements provides pre-delaminated points which control the onward propagation of the delamination, so leading to a more benign failure. Delamination caused by blade impact on the casing would tend to run towards such points, and then stop, probably temporarily. This is because delamination is a special case of crack propagation, and the force required to propagate a crack is less than that required to initiate the crack. By making the crack stop (albeit temporarily) at the pre-delaminated points defined by the film elements 10, the force has to build up before the crack/delamination can start again. This will entail more energy absorption than if the crack had simply propagated continuously. In practice, the delamination will be proceeding in multiple directions rather than linearly, and so will be temporarily arrested at various points along its propagation front as it encounters the film elements 10.

A hiatus at one film element 10 will simply slow down the advance at that point only. However, when the material delaminates the load stiffness balance changes and the load path in the material moves to regions of the structure that are more stiff. When there is delamination in just one layer the onward progression of that delamination will remain in the same layer as it is the only one with a stress riser effect. By adding patches of delamination in other layers onward propagation from that site is encouraged in a different layer of the laminate preferably at more than one site through the thickness of the composite i.e. the delamination stops in one layer and starts in one or more other layers.

By forcing the delamination to restart from a different layer, the film elements 10 increase the number of layers between which delamination can take place. This increases the energy absorption potential: energy to propagate a crack is related to the surface area of exposed material in the crack, so if the number of layers of material involved in delamination is doubled the amount of energy that the casing can absorb is correspondingly doubled.

The importance of randomness in the distribution of the film elements 10 is that a good random distribution should provide a good distribution of crack inhibition. In this case, true randomness may not be ideal; a controlled speckled effect could be better, based on a suitable algorithm to "fill in" the best next point where the density of the film elements 10 is not sufficient.

Figure 4:
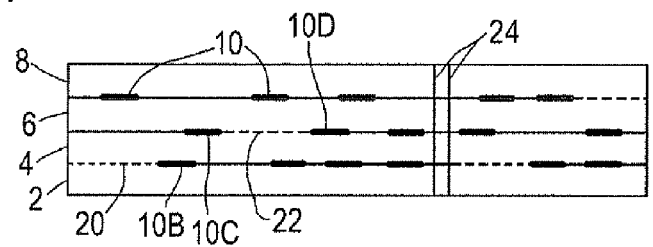
FIG. 4 is a diagrammatic representation of a composite component indicating regions of delamination.

This is illustrated schematically in FIG. 4, which shows a composite structure comprising four layers corresponding to the plies 2, 4, 6, 8 of FIG. 1. As can be seen in FIG. 4, the film elements 10 are distributed randomly at the interfaces between adjacent layers 2, 4, 6, 8. In FIG. 4, non-delaminated boundaries between adjacent layers 2, 4, 6, 8 are represented by solid lines, while delaminated regions of these boundaries are represented by dashed lines.

The optimum method of distributing the film elements is determined in part by their size and the area over which they are distributed. For smaller film elements, up to about 10 mm$^2$, it is possible to randomly place them by sprinkling; for larger film elements upto 100 mm$^2$ it is usually more preferable to place them individually in a pseudo random manner. However, it is possible to place film elements below about 10 mm$^2$ and sprinkle film elements above about 10 mm$^2$. Other appropriate distribution methods may be used.

Assuming hypothetically that a region of delamination is propagating from the left-hand end of the component shown in FIG. 4, it will be appreciated that delamination proceeds along the line 20 and is arrested by a film element 10B. The residual stress causing delamination is then applied substantially evenly over the component, with the result that delamination could continue to propagate along any of the interfaces between the layers 2, 4, 6, 8. In the example shown in FIG. 4, delamination then initiates at a different one of the film elements 10C, between the layers 4 and 6, and proceeds along the dashed line 22, to be arrested at a further film element 10D. Delamination then proceeds as shown in FIG. 4, skipping from interface to interface as each delaminated region is arrested temporarily by one of the film elements 10.

In an alternative embodiment, a composite aerofoil component in the form of a fan is "reinforced" by having the film elements 10 distributed randomly between various layers of the composite. The purpose is to control the directions of delamination in the blade following FOD such as a bird strike. As described for the containment casing above, the film elements 10 inhibit onward propagation, and tend to initiate delamination in a different direction, or from a different layer. After bird strike, it is desirable to encourage the delamination to stay towards the tip or edges of the blade, so that the main part of the blade stays substantially stiff. Excessive vibration amplitude drives the onward delamination, yet the blade needs to retain some aerodynamic function. Thus, the engine can produce a reasonable fraction of the original thrust in order that the aircraft can continue flying long enough to make a safe landing.

By controlling delamination by the presence of the film elements 10, the structural integrity of the main part of the blade can be substantially maintained, failure by delamination occurring only in the edge and tip of the blade. Consequently, the blade retains its inertial balance (mass at a given radial distance), which is critical to the operation of the undamaged blades of the blade set.

Also, by restricting the delamination to the edges and tip of the blade, the main part of the blade is still operational, and the blade as a whole continues to operate as an aerofoil (albeit with degraded capability). A bird strike event typically involves a number of consecutive blades from the same set—a number of blades will pass a given point in the time taken for bird to traverse a "bird-length" through the fan. Each blade will slice through a part of the bird, and take some proportion of the bird momentum. Thus, from a set of blades, a number will be affected (to varying extents) and so the number of unaffected blades may not be sufficient to maintain engine thrust. Consequently, even damaged blades should preferably deliver some thrust.

Figure 3:
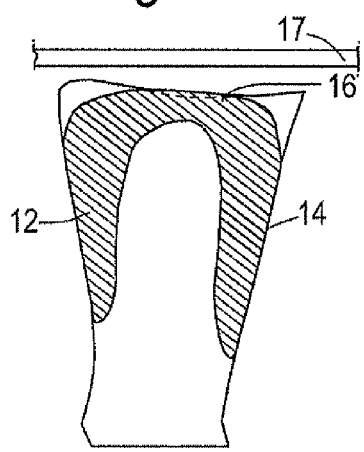
FIG. 3 is a diagrammatic representation of a fan blade indicating a region in which the film elements are distributed.

Finally, it has to be accepted that damaged blades cannot operate indefinitely. However, bird strike events typically happen when the aircraft is operating at low altitude (i.e. where birds can fly), and this tends to be at take-off or landing. So, generally, there is a reasonably convenient runway to land at, so long as the aircraft has time to get into a position from which it can land safely. The damaged blades must survive long enough for this. During the period of time taken for this to happen, the damaged blades will be under significant vibration loads because the damaged edge will be less stiff than as designed, and this will cause delamination to progress through the composite material. In order to resist propagation of delamination inwards towards the thicker parts of the blade (the middle and the root), the preferential delamination pattern enforced by the film elements 10 encourages propagation towards the tip of the blade, and encourages delamination to jump from one layer of the composite to the next in limited regions of the blade rather than in a single layer right across the blade. As described above in relation to the containment casing, the film elements 10 can help to achieve this. The ideal locations for the film elements 10 to be placed for this purpose are shown shaded in FIG. 3, from which it will be noted that the film elements 10 should be placed in the leading and trailing edge regions 12, 14 and in the tip region 16 of the blade. The aerofoil rotates about the engine axis (denoted by the line of short and long dashes) and a containment casing 17 is provided radially beyond the radially outer extremity of the aerofoil to deflect and contain the blade or blade fragments should the blade be released.

Sometimes it is not clear from visual inspection whether a bird strike event has taken place. One way to determine this is to check the frequency response of each bade. A blade with any level of delamination present in it will have a lower frequency response than an undamaged blade. Any delamination would be localised to the edges of the blade where the material is relatively thin and techniques such as C-scanning should be able to identify any damage.

The use of randomly distributed film elements 10 can also have uses in creating deliberate and controlled delamination in a component of composite material, such as a leaf spring.

Leaf springs are traditionally used for suspension systems in vehicles, for example railway carriages. The springs enable a smooth ride inside such a carriage, as the vibration is damped by the leaf spring arrangement at the mounting point (the wheel axle) of the carriage. Traditionally a leaf spring is made from a number of strips or leaves of metal, bent into an arch shape, and strapped together. When a load is applied to the leaf spring, each leaf bends, and as a result the contacting surfaces of adjacent leaves move with respect to each other. The resulting friction damps the vibration, dissipating the energy stored in the spring.

In the traditional manufacture of such springs, each leaf is manufactured separately. The leaves are then assembled and bound together by a separate binding component. Using the principles underlying the present invention, a leaf spring can be made from a composite material. Each leaf comprises a layer of a single composite component, the leaves/layers being separated (or partially separated) from each of its neighbours by film elements, for example of PTFE. Thus a leaf spring assembly could be made as a single part and "broken in" before initial use by stressing the single part to cause delamination at the interfaces provided with the film elements 10. This delamination thus separates the individual leaves of the spring from one another so they can slide over one another as they flex.

In some circumstances, it may be preferable for the leaf spring to be very stiff during initial use, and to have leaf spring behaviour with lower stiffness only after it has been subjected to a shock loading above a predetermined magnitude. In this case, the layers would be predominantly intact (i.e. non-delaminated) during initial use, until a shock load of sufficient energy causes delamination between neighbouring leaves at the sites of the film elements. In effect, the leaf spring acts like a fuse, resisting loads during normal use to minimise deflection, but releasing to absorb energy, and undergo deformation, if large shock loads are applied. Thus, this concept could be applied to structures other than leaf springs, such as vehicle bumpers and side impact bars, motorway or race track perimeter fencing, or even railway buffers.

In a gas turbine engine, the "fuse" concept could find application in a structure such as a front bearing housing which provides rigid support to the fan during normal operation, but which, under fan blade off loads, provides controlled failure of part of the structure to allow more flexibility in the bearing at that point.

The invention claimed is:

1. An aerofoil component for a gas turbine engine comprising adjacent layers and a resin matrix wherein
in the resin matrix, randomly distributed film elements of a release material are disposed between the adjacent layers which inhibit adhesion between regions of the resin on opposite sides of the respective film elements, and
the film elements are provided at edge and tip regions of the component, but are absent in the central region of the component.

2. A component as claimed in claim 1, wherein the film elements initiate delamination between layers of the component at a loading in excess of a threshold load, whereby the component has a first stiffness when subjected to loading below the threshold load and has a second stiffness, lower than the first stiffness, after the component has been subjected to a load above the threshold load.

3. A component as claimed in claim 1, in which at least some of the film elements are entirely embedded in the resin matrix.

4. A component as claimed in claim 1, which comprises at least three layers, the film elements being disposed between the layers of at least two pairs of immediately adjacent layers, each adjacent layer having glass or carbon fibres.

5. A component as claimed in claim 1 wherein a reinforcement member extends through the adjacent layers.

6. A component as claimed in claim 1, wherein at least some of the film elements have a maximum transverse dimension which is not greater than 10 µm.

7. A component as claimed in claim 1, wherein at least some of the film elements are self-supporting.

8. A component as claimed in claim 1, wherein at least some of the film elements are made from polytetrafluoroethylene.

* * * * *